United States Patent [19]

Furuta

[11] 4,408,234

[45] Oct. 4, 1983

[54] RECORDING APPARATUS WITH AUTOMATIC ACTUATOR

[75] Inventor: Kenji Furuta, Hachioji, Japan

[73] Assignee: Olympus Optical Co., Ltd., Tokyo, Japan

[21] Appl. No.: 279,629

[22] Filed: Jul. 1, 1981

[30] Foreign Application Priority Data

Jul. 11, 1980 [JP] Japan .................................. 55-94795

[51] Int. Cl.$^3$ ............................................. G11B 15/00
[52] U.S. Cl. ..................................... 360/69; 360/74.4; 369/47; 369/124
[58] Field of Search ..................... 360/69, 71, 73, 74.4, 360/55; 369/47, 48, 124

[56] References Cited

U.S. PATENT DOCUMENTS 4,120,009 10/1978 Iwasawa ............................... 360/71
4,125,865 11/1978 Mohammadioun ............... 360/69 X Primary Examiner—Robert L. Richardson
Attorney, Agent, or Firm—Frishauf, Holtz, Goodman & Woodward

[57] ABSTRACT

Disclosed is a recording apparatus with automatic actuator which includes a recording circuit for recording a recording signal on a recording medium, a drive circuit for moving the recording medium at a predetermined speed and an instruction circuit for providing an instruction signal for moving the recording medium to the drive circuit for a period, during which the magnitude of the recording signal is above a fixed sense level.

The recording circuit includes a delay circuit for delaying the recording signal for delay period substantially equal to or longer than a period from an instant when the instruction circuit provides the instruction signal till an instant when the recording medium is being moved substantially at a prescribed speed.

8 Claims, 18 Drawing Figures

F I G. 1
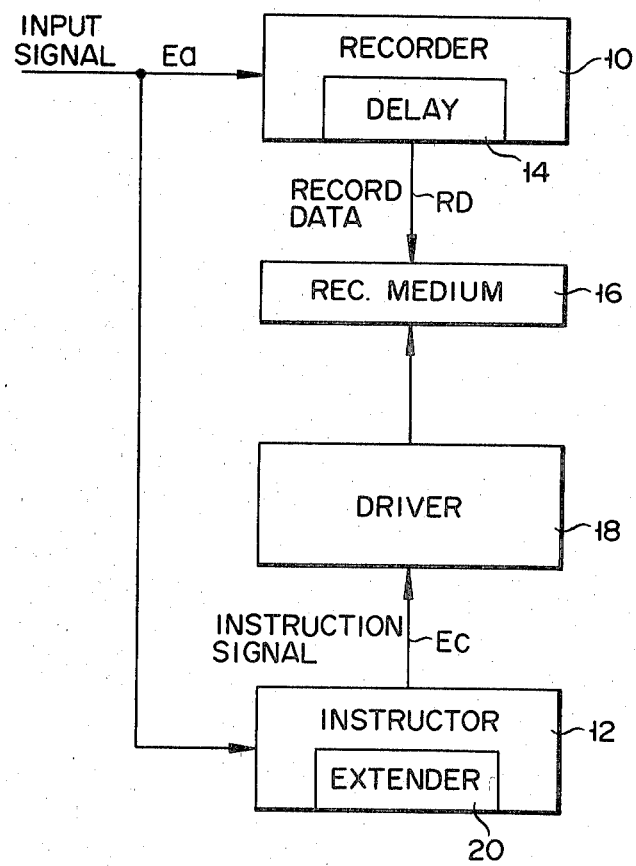

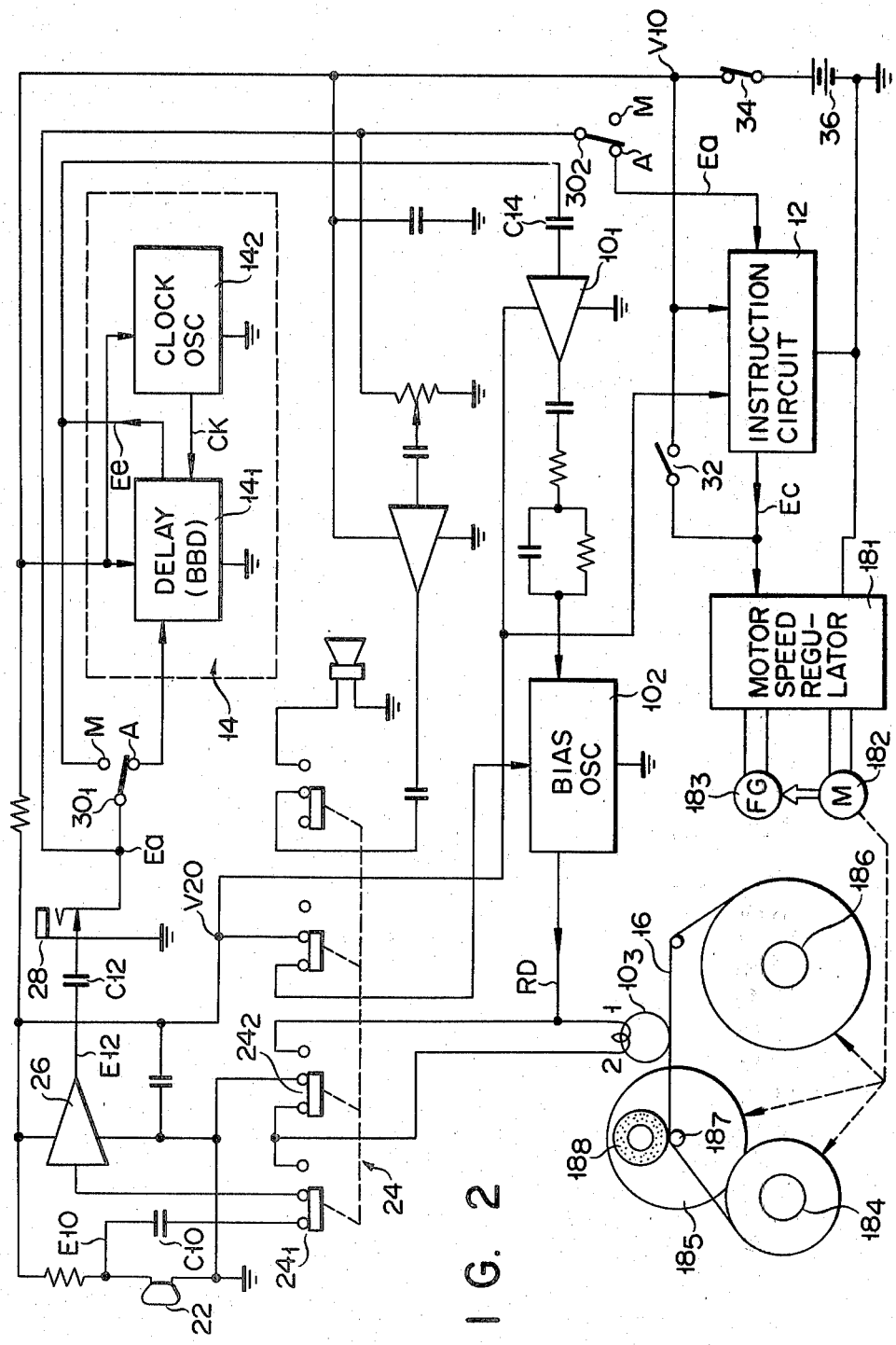
F I G. 2

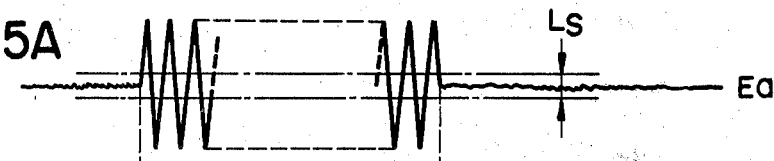
FIG. 5A
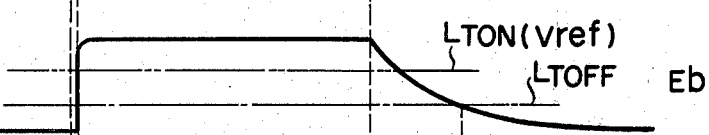
FIG. 5B
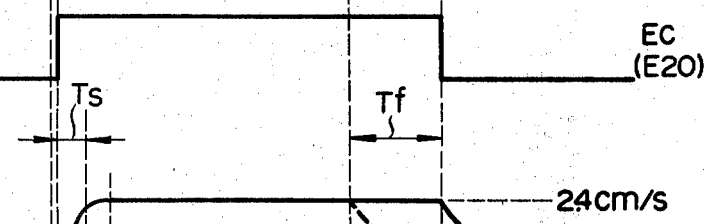
FIG. 5C
FIG. 5D
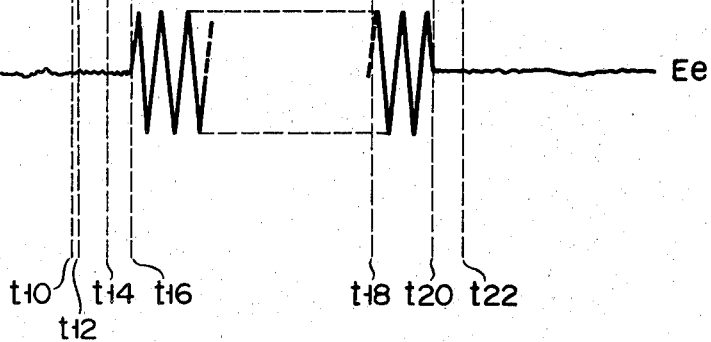
FIG. 5E

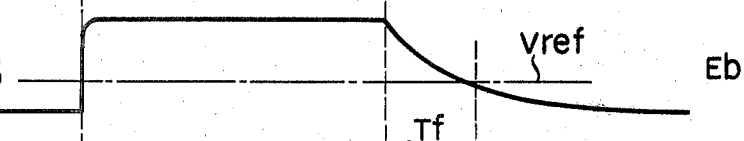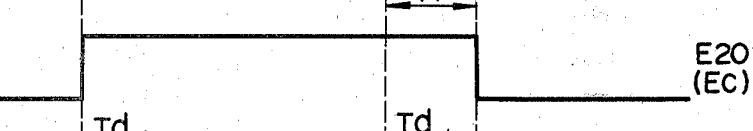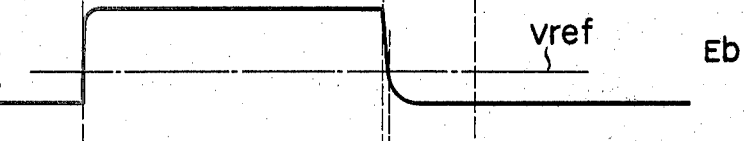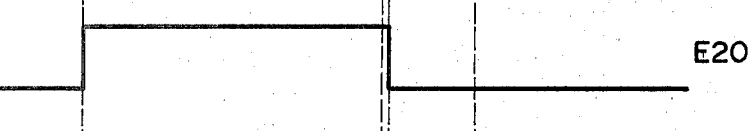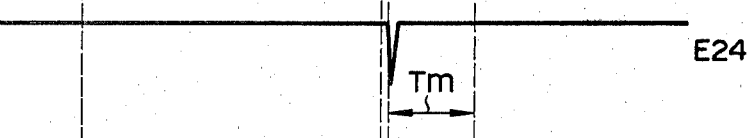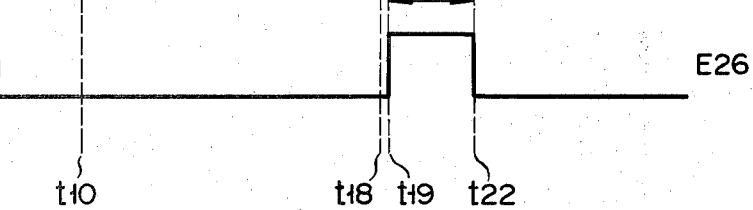

4,408,234

RECORDING APPARATUS WITH AUTOMATIC ACTUATOR

BACKGROUND OF THE INVENTION

This invention relates to tape recorders which have, for instance, a function of automatically starting the recording when an audio signal is supplied, and automatically stopping the recording with the vanishment of the audio signal.

Taper recorders for recording dictations or the like are desirably provided with an automatic starter or actuator for preventing the wasting of the recording tape. Where the automatic actuator is provided, recording on the recording tape is made only when the voice pressure is given to the microphone. In this case, the running of the tape during a voice-free period, during which dictation is not given, is prevented. The tape recorder provided with an automatic actuator as described is disclosed in, for instance, in FIG. 7 of U.S. Pat. No. 4,120,009 (Oct. 10, 1978).

Such a tape recorder provided with an automatic actuator, however, has problems in that a leading portion of dictation immediately after the start of recording fails to be recorded and that the initial period after the start of recording is prone to the deviation of pitch. The failure of recording of the initial portion of dictation is attributable to a slight time delay that is involved from the instant when voice is coupled till the instant when the actual operation of the tape transporting mechanism is started. A motor and a capstan flywheel in the tape drive system have large inertia. Therefore, a slight period of time is involved from the start of the operation of the tape transporting mechanism till the reaching of a predetermined running speed by the tape. This causes the aforementioned deviation of pitch in the initial period from the start of recording.

Due to the aforementioned two problems, i.e., failure of recording of an initial portion of dictation and deviation of pitch, with a tape recorder which is provided with a mere automatic actuator the spoken voice in the initial stage from the start of the automatic recording cannot be entirely and accurately recorded. Particularly, consonants which are quite often included in an initial portion of dictation given from the start of the recording, are uttered in very short periods of time. Therefore, failure of correct recording of consonants uttered in an initial period from the start of recording is liable, making the content of the corresponding portion of the dictation very indistinct.

SUMMARY OF THE INVENTION

The invention is intended in the light of the above affairs, and its object is to provide a recording apparatus with automatic actuator, which can accurately record the initial portion of signal to be recorded.

To attain this object, the recording apparatus with automatic actuator according to the invention includes delaying means for delaying the signal to be recorded for a period corresponding to a period from an instant when the mechanism for driving a recording medium is rendered operative till an instant when the recording medium is being driven at a prescribed speed by the mechanism. With the recording signal delayed for the aforementioned prescribed period of time by the delaying means, the recording of signal is started only after the reaching of the prescribed speed by the recording medium. Thus, the initial portion of the recording signal can be completely recorded.

The recording apparatus according to the invention can also incorporate extension means for permitting the recording medium to be continually driven for a predetermined period of time after the vanishment of the recording signal. Such extension means can prevent the reduction of the running speed of the recording medium or prevent stopping of the function of the mechanism before the end of the complete recording of the signal delayed by the delaying means. With the combination of the delaying means and extension means, it is possible to completely record a signal from the leading to the trailing end thereof.

BRIEF DESCRIPTION OF THE DRAWINGS

FIG. 1 is a block diagram showing the basic construction of an embodiment of the recording apparatus with automatic actuator according to the invention;

FIG. 2 is a schematic representation of a specific from of the basic construction shown in FIG. 1;

FIGS. 5A through 5E show a timing chart illustrating the operation of the recording apparatus with automatic actuator shown in FIGS. 1 to 3;

FIGS. 7A through 7H show a timing chart illustrating the operation of the circuit of FIG. 6 when applied to the automatic actuator shown in FIG. 2.

DETAILED DESCRIPTION OF THE PREFERRED EMBODIMENTS

Figure 3:
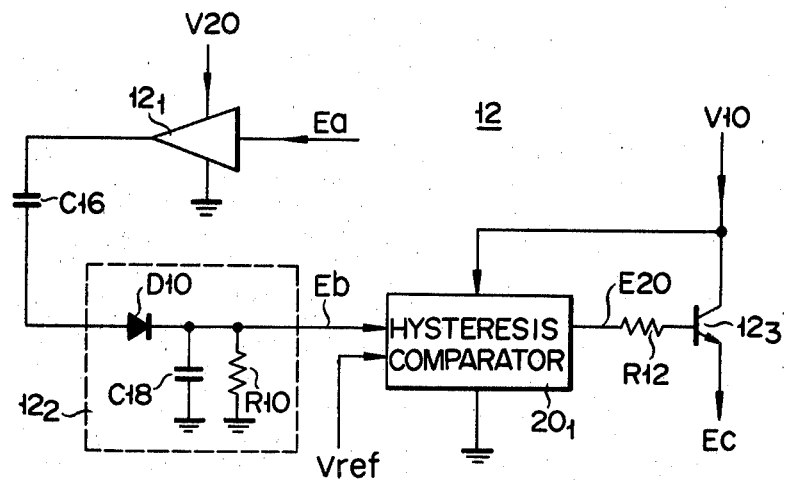
FIG. 3 is a circuit diagram showing a specific example of an instruction circuit shown in FIG. 2.

Before proceeding with the description of the embodiments of the invention, it will expressly be understood that like reference symbols are used to designate like portions throughout the drawings for simplicity of illustration and that the components designated by like reference symbols may easily be replaced with each other or one another with minor change thereof by a skilled person in the art. An embodiment of the recording apparatus with automatic actuator according to the invention will now be described.

FIG. 1 shows the basic construction of the recording apparatus with automatic actuator according to the invention. An input signal Ea such as a dictation signal which is to be recorded is coupled to a recorder 10 and an instructor 12. The recorder 10 includes a delay circuit 14 for delaying the signal Ea for a given period of time (delay period). The delayed signal to be recorded, delayed by the delay circuit 14, is supplied as recording data RD to a recording medium 16 such as a magnetic tape. That is, dictation information corresponding to the signal Ea is recorded on the recording medium 16 after it is delayed by the delay circuit 14.

The recording medium 16 is driven by a driver 18 such as a tape running mechanism. The timing with which the operation of the driver 18 is started is determined by the instructor 12. When the magnitude or level of the input signal Ea exceeds a sense level which is higher than noise levels, the instructor 12 provides an instruction signal Ec for running the medium 16 to the driver 18. With the signal Ec supplied, the driver 18 is caused to drive the medium 16. The delay time provided by the delay circuit 14 is determined by a period from the instant when the signal Ea exceeds the sense level mentioned above till the reaching of a prescribed speed (for instance 2.4 cm/sec.) by the medium 16 (which is referred to as first period). For example, the delay period is set to be slightly longer than the period from the instant of reaching of the sense level by the signal Ea till the reaching of 80 to 90% of a running speed of 2.4 cm/sec. by the medium 16. With this delay of signal by the delay circuit 14, the recording data RD is recorded on the medium 16 after the reaching of substantially the prescribed speed by the medium 16. Thus, the initial portion of the signal Ea, for instance corresponding to a first consonant in the dictation, can be accurately recorded.

The instructor 12 may, if necessary, include an extender 20. What takes place after the start of recording of the input signal Ea will now be considered. Immediately after the level of the signal Ea has become lower than the sense level after the dictation, the recording data RD sill contains the trailing portion of the signal Ea. Therefore, if the running of the recording medium 16 is immediately stopped at this instant, it results in the failure of recording of the trailing portion of signal on the medium 16. If the medium is driven at a sufficient speed to provide a momentum enough to cover the trailing portion of signal, the extender 20 may be omitted. However, where the momentum is insufficient to permit proper recording of the aforementioned trailing portion, it is desirable to incorporate the extender 20.

The extender 20 permits the instruction signal Ec to be continually provided for an extended period after the input signal Ea has become lower than the sense level until the recording data RD is completely recorded. The extended period during which the signal Ec is continually provided by the extender 20 (which is referred to as second period) is determined by the momentum running of the recording medium 16 and the delay period provided by the delay circuit 14. Generally, the delay period is set to be longer than the aforementioned first period from the start of running of the medium 16 till the reaching of the prescribed speed, and the second period during which the signal Ec is continually provided by the instructor 12 is usually set to be longer than the delay period mentioned above.

FIG. 2 shows a specific example of the tape recorder circuit having the basic construction shown in FIG. 1. Although the circuit of FIG. 2 includes recording and reproducing (playback) circuits, the following description will be given in connection with the recording only. A dictation signal E10 detected by a microphone 22 is coupled through a capacitor C10 and a record/-playback switch $24_1$ to an amplifier 26, and the amplified dictation signal E12 therefrom is coupled through a capacitor C12 to the switch contact of a line input jack 28. To the jack 28 may be coupled a communication signal from, for instance, a telephone set pick-up. If a plug (not shown) for the line signal is not inserted to the jack 28, the signal E12 is supplied as an input signal Ea to an auto/manual switch $30_1$. The switch $30_1$ is ganged to a switch $30_2$ which will be described hereinafter in detail, and it is set to the side of contact A when making recording by automatic actuation. Otherwise, it is set to the side of contact M.

The input signal Ea is coupled through the contact A of the switch $30_1$ to a signal delay circuit $14_1$. To the circuit $14_1$ is supplied a clock signal CK from a clock oscillator $14_2$. The delay circuit $14_1$ delays the input signal Ea for a period inversely proportional to the frequency of the clock signal CK. The circuit $14_1$ may be constructed using a commercially available BBD element. A delayed signal Ee appearing from the circuit $14_1$ is coupled through a capacitor C14 to a recording amplifier $10_1$. This signal Ee is equivalent to a signal obtained by delaying the signal Ea for a given delay period. In case where a 2,048-stage BBD is used as the circuit $14_1$ and the frequency of the clock signal CK is set to 2 kHz, a delay period of 512 msec. can be obtained.

The output of the recording amplifier $10_1$ is coupled through a CR circuit for recording equalization to a bias oscillator circuit $10_2$. With the output signal from the amplifier $10_1$, the bias oscillator circuit $10_2$ provides a recording current or recording data RD with an amplitude modulation of a high frequency bias signal. The bias oscillator circuit $10_2$ may be of the usual series bias supply type. The data RD is coupled to one end of a recording head $10_3$, which has its other end grounded through a switch $24_2$. The head $10_3$ provides a recording magnetic field, which corresponds to the delayed signal Ee coupled to the amplifier $10_1$, to a magnetic tape (recording medium) 16. Thus, the signal Ee which is delayed after the input signal Ea by the period Td is recorded on the tape 16.

The input signal Ea is also coupled through the contact A of the ganged auto/manual switch $30_2$ mentioned above to an instruction circuit 12. The circuit 12 provides an instruction signal Ec, which goes to a high level when the signal Ea exceeds a predetermined level ($L_{TON}$). The signal Ec is coupled to a power supply input of a motor control circuit or motor speed regulator $18_1$. The power supply input is further connected through a pause switch 32 and a power switch 34 to the positive pole of a power supply 36. When the pause switch 32 is "on", the regulator $18_1$ is always furnished with a power supply voltage $V_{10}$, so that no automatic actuation takes place. When the switch 32 is "off" (i.e., in a pause state), the state of voltage supply to the regulator $18_1$ is determined by the level of the signal Ec. The regulator $18_1$ provides a control output to a DC motor $18_2$, and a frequency generator (FG) $18_3$ is connected to a control input of the regulator $18_1$. The motor $18_2$ and FG $18_3$ are connected to each other to form a FG servomotor. For the speed regulator $18_1$, various kinds of commercially available IC, for instance Model TCA955 by Siemens Co. in West Germany, may be used.

The DC motor $18_2$ is coupled to a take-up reel $18_4$, a capstan flywheel $18_5$ and/or a supply reel $18_6$. When making recording by automatic actuation, the rotation of the motor $18_2$ is usually transmitted only to the reel $18_4$ and capstan flywheel $18_5$. When the state in which the supply voltage is fed to the motor speed regulator $18_1$ is established by the instruction signal Ec, the magnetic tape 16 is driven at the prescribed speed by a capstan $18_7$ and a pinch roller $18_8$.

FIG. 3 shows a specific example of the instruction circuit 12 shown in FIG. 2. The input signal Ea which is led through the auto/manual switch $30_2$ is coupled to an amplifier $12_1$. The output of the amplifier $12_1$ is coupled through a capacitor C16 to the anode of a diode D10, which has its cathode grounded through a CR circuit formed by a capacitor C18 and a resistor R10 in parallel with each other. The diode D10, capacitor C18 and resistor R10 form a rectifier circuit $12_2$ rectifying the output of the amplifier $12_1$. The circuit $12_2$ rectifies the AC component of the output signal of the amplifier $12_1$ and provides a comparing signal Eb which includes a DC component corresponding to the AC component mentioned. The charge time constant with respect to the capacitor C18 is small and is determined chiefly by the output impedance of the amplifier $12_1$ and the "on" state resistance of the diode D10. Thus, when a signal having an amplitude surpassing the noise levels (i.e., having a level above the sense level) is coupled as the signal Ea to the amplifier $12_1$, the level of the signal Eb quickly rises. The upper limit of the level of the signal Eb is usually slightly lower than a supply voltage V20 supplied to the amplifier $12_1$. When the signal Ea vanished, the diode D10 is cut off. Thus, the discharge time constant with respect to the capacitor C18 is large and is chiefly determined by the resistor R10. With a small charge time constant and a large discharge time constant that are provided with the above arrangement, it is possible to provide for a short rise period (t10 to t12) of the signal Eb and a long fall period (t18 to t22) as shown in FIG. 5B.

Figure 4:
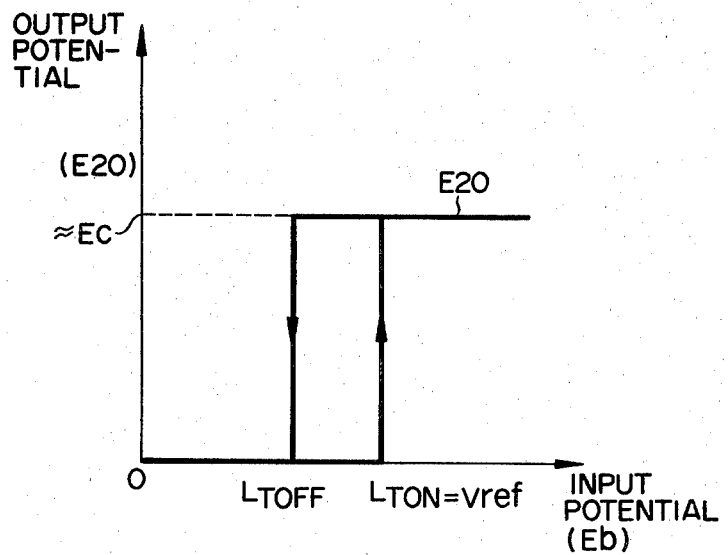
FIG. 4 is a graph showing an output versus input characteristic of a hysteresis comparator shown in FIG. 3.

The signal Eb mentioned above is coupled to a hysteresis comparator $20_1$, which is given a reference potential Vref. The comparator $20_1$ has an output versus input characteristic as shown in FIG. 4 and is commercially available; an example of the commercially available product is IC, Model M51201L by Mitsubishi Electric Co., Ltd in Japan. The comparator having the characteristic as shown in FIG. 4 may also be obtained with an emitter-coupled Schmitt trigger circuit. When the level of the signal Eb exceeds a first threshold level $L_{TON}$ which corresponds to the reference potential Vref, the comparison output E20 of the comparator $20_1$ goes to a high level. This output E20 is coupled through a resistor R12 to the base of an NPN transistor $12_3$. With the change of the output signal E20 to the high level, the transistor $12_3$ is thus rendered conductive, whereupon the instruction signal Ec mentioned above is provided from the emitter of the transistor.

FIGS. 5A through 5E form a timing chart illustrating the operation of the recording apparatus with automatic actuator shown in FIGS. 1 through 3. It is now assumed that dictation sound is picked up by the microphone 22 at an instant t10. As a result, the envelope of the input signal Ea, which has been noises only before the instant t10, comes to exceed the sense level LS from the instant t10 as shown in FIG. 5A. With the level LS exceeded by the signal Ea, the output of the rectifier circuit $12_2$ or comparing signal Eb quickly rises as shown in FIG. 5B. When the level of the signal Eb exceeds the reference potential level Vref, i.e., the first threshold level $L_{TON}$, the output E20 of the comparator $20_1$ goes to a high level. As a result, the instruction signal Ec goes to a high level at the instant t12, at which a condition $Eb \geq L_{TON}$ is satisfied, as shown in FIG. 5C. With this change of the signal Ec to the high level, power is supplied to the motor speed regulator $18_1$, thus causing the rotation of the motor $18_2$.

It is assumed that the prescribed speed (for instance 80 to 90% of 2.4 cm/sec.) is reached by the magnetic tape 16 at an instant t14 after the instant t12 at which the motor $18_2$ is energized, as shown in FIG. 5D. The period TS from the instant t12 till the instant t14 chiefly stems from the inertias of the rotor of the motor $18_2$ and the capstan flywheel $18_5$. Where the starting torque of the motor $18_2$ is strong and the inertias mentioned above are low, however, the period TS may be held within the order of several 100 msec. If the period TS is 300 to 400 msec., a delay period Td of 400 to 500 msec., provided by the delay circuit $14_1$, is satisfactory. By this delay period Td, the signal Ee that is coupled to the recording amplifier $10_1$ is delayed after the input signal Ea as shown in FIG. 5E. As mentioned previously, if TS<Td, the magnetic tape 16 is substantially in its state being run at the prescribed speed at the instant t16 of appearance of the signal Ee, and thus the initial portion of the signal Ea can be completely recorded.

When the dictation is ended at an instant t18 as shown in FIG. 5A, the envelope of the input signal Ea is reduced to the noise level at this time. As a result, the comparing signal Eb coupled to the hysteresis comparator $20_1$ begins to decrease gradually. When $Eb \leq L_{TOFF}$ is satisfied at an instant t22 as shown in FIG. 5B, the output E20 of the comparator $20_1$ returns to a low level. As a result, the instruction signal Ec is returned to a low level as shown in FIG. 5C, thus cutting power supply to the motor $18_2$. Thereafter, i.e., after the instant t22 in FIG. 5D, the speed of the magnetic tape 16 is gradually reduced until the tape 16 is eventually stopped. The period Tf from the instant t18 till the instant t22 is determined by the level of the signal Eb, a second threshold level $L_{TOFF}$ of the comparator $20_1$ and the time constant of the CR circuit of C18 and R10. The signal Ee is delayed after the signal Ea by the delay period Td as shown in FIG. 5E. Thus, the signal Ee can be completely recorded from its leading end (corresponding to the instant t16) to its trailing end (corresponding to the instant t20) if the instant t22 at which the signal Ec returns to the low level is after the instant t20 of vanishment of the signal Ee. That is, the trailing end portion of the signal Ee can be completely recorded if Tf>Td.

A dashed curve X in FIG. 5D represents the speed of the magnetic tape 16 that results in case when the period Tf is zero. In this case, the delayed signal Ee is recorded at irregular pitches during the period from the instant t18 till the instant t20. Therefore, in the reproduction of the recorded signal Ea, it is difficult to catch the trailing end portion of the dictation. However, if the delay period Td is several 100 msec., the probability that a consonant is involved in this portion of the distation is low. Utility can thus be found even if the condition Tf>Td is not satisfied. To ensure complete recording of the signal Ea (or Ee), however, it is necessary to set Td and Tf such as to meet a condition $$TS \leq Td \leq TF \qquad \ldots (1)$$

Figure 6:
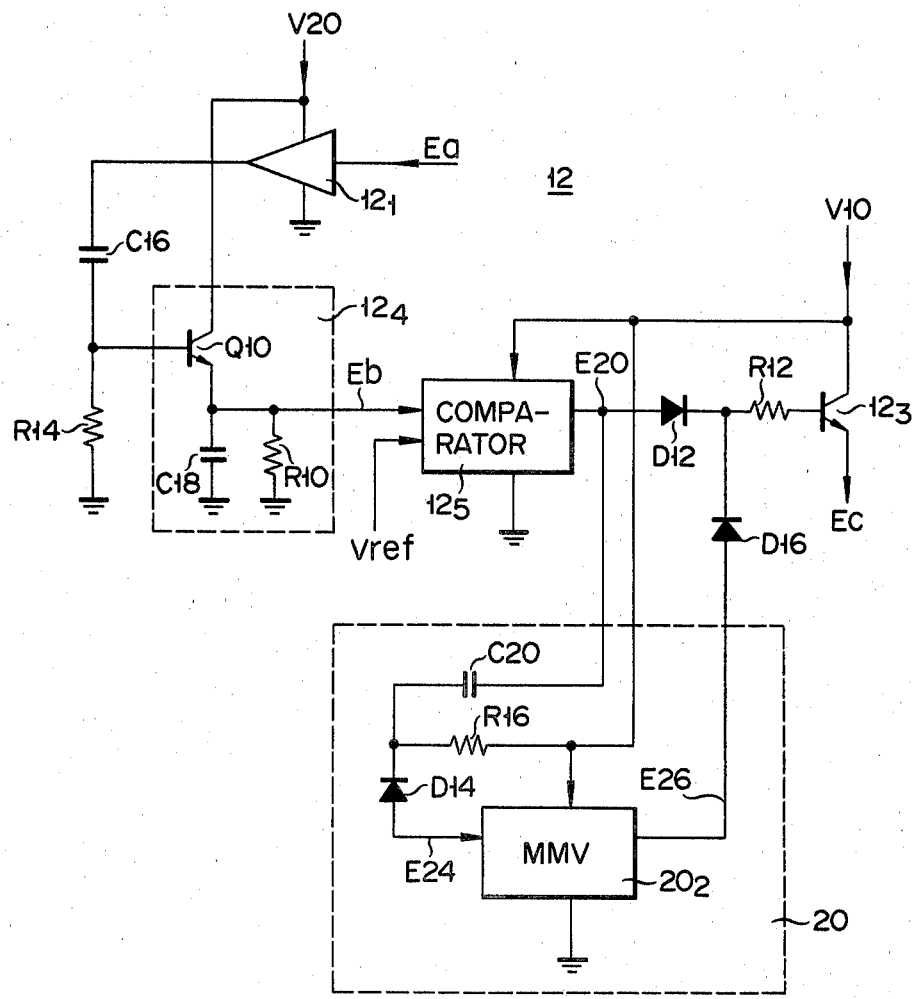
FIG. 6 is a circuit diagram showing a modification of the circuit shown in FIG. 3.

FIG. 6 shows a modification of the instructor 12 shown in FIG. 3. Here, the output side of the amplifier $12_1$ is grounded through a capacitor C16 and a resistor R14. To the juncture between the capacitor C16 and resistor R14 is connected the base of an NPN transistor Q10, which has its collector connected to a voltage supply of V20 and its emitter connected through a circuit formed by a capacitor C18 and a resistor R10 in parallel with each other. The transistor Q10, capacitor C18 and resistor R10 form a rectifier circuit $12_4$ which rectifies the output of the amplifier $12_1$. The current coupled to the base of the transistor Q10 is current-amplified to several 100 times by the transistor Q10. Thus, the capacitor C18 can be charged up in a very short period of time even if its capacitance is set to a value which is far higher than that in the case of FIG. 3. With the rectifier circuit $12_4$ of FIG. 6, the comparing signal Eb provided from the emitter of transistor Q10 can thus rise more quickly and fall at a very slow rate. The signal Eb is coupled to a comparator $12_5$. The comparator $12_5$ is also given a reference potential Vref. It need not always have a hysteresis as shown in FIG. 4. It generates an output E20 which goes to a high level when a condition $Eb \geq Vref$ comes to be satisfied. The output E20 is also coupled through a diode D12 and a resistor R12 to the base of an NPN transistor $12_3$.

The instructor circuit 12 described above operates as in the following. When the input signal Ea exceeds a sense level LS at an instant t10 as shown in FIG. 7A, the signal Eb quickly rises. The rate of rise is the higher the greater is the current amplification factor of the transistor Q10. In this case, the instant when the condition $Eb \geq Vref$ comes to be satisfied substantially coincides with the instant t10. When the input signal Ea vanishes at an instant t18, the capacitor C18 is no longer charged. As a result, the level of the signal Eb is gradually reduced as shown in FIG. 7B. By setting the time constant of the circuit of the capacitor C18 and resistor R10 to be greater than that shown in the case of FIG. 3, it is possible to make sufficiently long the period from the instant t18 till the establishment of the condition $Eb < Vref$, i.e., the second period from the instant t18 till the instant t22 when the output E20 returns to the low level as shown in FIG. 7C. That is, it is possible to set $Td \leq Tf$.

In FIG. 6, an extension circuit 20 is separately provided in order to cope with the case when the period form the instant t18 till the instant of establishment of the condition $Eb < Vref$ (i.e., the period from the instant t18 to the instant t19) is shorter than the delay period Td. The output E20 from the comparator $12_5$ is coupled through a capacitor C20 to the cathode of a diode D14. A supply voltage is applied through a resistor R16 to the cathode of the diode D14. The capacitor C20 and resistor R16 form a differentiating circuit. The falling edge of the output E20 is differentiated by the differentiating circuit, and the output thereof through the diode D14 is a negative trigger pulse E24. The trigger pulse E24 is coupled to the trigger input of a monostable multivibrator (MMV) $20_2$. The MMV $20_2$ provides an extension signal E26 having a fixed pulse width Tm every time it is triggered by the pulse E24. The pulse width Tm is determined by the time constant of the MMV $20_2$ itself. The signal E26 is coupled through a diode D16 and the resistor R12 to the base of the transistor $12_3$.

FIGS. 7E through 7H show the operation of the instruction circuit 12 inclusive of the extension circuit 20. If the time constant of the circuit of the capacitor C18 and resistor R10 is small, with the vanishment of the input signal Ea at the instant t18 the output E20 returns to a low level below the level Vref at an instant t19 very soon after the instant t18. However, the MMV $20_2$ is triggered by the trigger pulse E24 which is generated by the falling edge of the output E20. Thus, when the output E20 returns to the low level at the instant t19, the high level extension signal E26 having the pulse width Tm is provided in its place to the transistor $12_3$. Thus, during the period of the high level state of signal E26 till the instant t22, the instruction signal Ec is at the high level. In this way, the condition $Td < Tf$ is satisfied.

The embodiments given in the foregoing description and illustrated in the drawings are by no means limitative, and various changes and modifications of them can be made without departing from the scope and spirit of the invention. For example, the recording medium 16 need not be a magnetic tape, the signal recorded need not represent a dictation. Alternatives to the magnetic tape as the recording medium 16 may, for instance, be a magnetic disc or a photo-sensitive film. (In the latter case the head $10_3$ is replaced with a light-emitting element.) Further, the recording signal or input signal Ea may be digital data, and in this case the delay circuit $14_1$ may be a shift register. Further, the delay circuit $14_1$ may be replaced with other delay elements such as CCD.

What is claimed is:

1. A recording apparatus with automatic actuator comprising:
   (a) recording means for recording a recording signal on a recording medium;
   (b) drive means for moving said recording medium at a prescribed speed;
   (c) instruction means coupled to said drive means and responsive to said recording signal for providing an instruction signal for moving said recording medium to said drive means for a period, during which the magnitude of said recording signal is above a fixed sense level; and
   (d) delay means coupled to said recording means for delaying said recording signal for a delay period substantially equal to or longer than a first period from an instant when said instruction means provides said instruction signal till an instant when said prescribed speed is substantially reached by said recording medium.

2. A recording apparatus with automatic actuator comprising:
   (a) a recording medium for recording a recording signal on a recording medium;
   (b) drive means for moving said recording medium at a prescribed speed;
   (c) instruction means coupled to said drive means and responsive to said recording signal for providing an instruction signal for moving said recording medium to said drive means for a period, during which the magnitude of said recording signal is above a fixed sense level;
   (d) delay means coupled to said recording means for delaying said recording signal for a delay period substantially equal to or longer than a first period from an instant when said instruction means provides said instruction signal till an instant when a prescribed speed is substantially reached by said recording medium; and
   (e) extension means for permitting said instruction signal to be continually provided for a second period determined by said delay period after the instant when the magnitude of said recording signal becomes less than said fixed sense level after it has once exceeded said fixed sense level.

3. An apparatus of claim 2, wherein said second period is substantially equal to or longer than said delay period.

4. An apparatus of claim 2 or 3, wherein:
   said instruction means includes a rectifing circuit for providing a comparing signal having a potential level corresponding to the magnitude of said recording signal; and
   said extension means includes a comparator circuit for generating said instruction signal in response to said comparing signal, said comparator circuit having a first threshold level and a second threshold level and providing said instruction signal for a period from an instant when the level of said comparing signal exceeds said first threshold level till an instant when it becomes less than said second threshold level, said first threshold level being higher than said second threshold level.

5. An apparatus of claim 2 or 3, wherein:
said instruction means includes a rectifying circuit for providing a comparing signal having a level corresponding to the magnitude of said recording signal; and
said extension means includes:
a comparator for comparing the level of said comparing signal and a reference voltage level and providing a comparison result output if said comparing signal is higher than said reference voltage;
a timer circuit for providing an extension signal for a predetermined period in response to said comparison result output, said timer circuit providing said extension signal from the instant of vanishment of said comparison result output after the appearance thereof; and
an OR circuit coupled to said comparator and timer circuit for providing said instruction signal while at least either said comparison result output or extension signal prevails.

6. A recording apparatus with automatic actuator comprising:
(a) recording means for recording an audio signal on a magnetic tape;
(b) tape drive means for moving said magnetic tape;
(c) comparing signal generating means coupled to said tape drive means for generating a comparing signal having a potential level corresponding to the magnitude of said audio signal; and
(d) comparing means coupled to said comparing signal generating means for providing an instruction signal for moving said magnetic tape to said tape drive means in response to said comparing signal, said comparing means having a first threshold level and a second threshold level lower than said first threshold level and providing said instruction signal for a period from an instant when the level of said comparing signal exceeds said first threshold level till an instant when it becomes less than said second threshold level; and
(e) delay means coupled to said recording means for delaying said audio signal for a prescribed period of time.

7. A recording apparatus with automatic actuator comprising:
(a) recording means for recording an audio signal on a magnetic tape;
(b) tape drive means for moving said magnetic tape;
(c) rectifying means coupled to said tape drive means for rectifying said audio signal;
(d) time constant means coupled to said rectifying means for integrating the rectified audio signal to generate a comparing signal having a level corresponding to the magnitude of said audio signal, the discharge time constant of said time constant means being greater than the charge time constant thereof;
(e) comparing means coupled to said time constant means for providing an instruction signal for moving said magnetic tape to said tape drive means in response to said comparing signal, said comparing means having a reference voltage level and providing said instruction signal while the level of said comparing signal is above said reference voltage level; and
(f) delay means coupled to said recording means for delaying said audio signal for a prescribed period of time.

8. A recording apparatus with automatic actuator comprising:
(a) recording means for recording an audio signal on a magnetic tape,
(b) tape drive means for driving said magnetic tape;
(c) comparing signal generating means coupled to said tape drive means for generating a comparing signal having a level corresponding to the magnitude of said audio signal;
(d) comparing means coupled to said comparing signal generating means for comparing the level of said comparing signal and a reference voltage level to provide a comparison result output if said comparing signal is higher in level than said reference voltage;
(e) timer means coupled to said comparing means for providing an extension signal for a predetermined period in response to said comparison result output, said extension signal being provided from an instant vanishment of said comparison result output after it has once been generated; and
(f) means coupled to said comparing means and timer means for providing an instruction signal for moving said magnetic tape to said tape drive means while at least either said comparison result output or said extension signal prevails; and
(g) delay means coupled to said recording means for delaying said audio signal for a prescribed period of time.

* * * * *